(12) United States Patent
Sypniewski et al.

(10) Patent No.: US 12,334,075 B2
(45) Date of Patent: Jun. 17, 2025

(54) HARDWARE EFFICIENT AUTOMATIC SPEECH RECOGNITION

(71) Applicant: Deepgram, Inc., San Francisco, CA (US)

(72) Inventors: Adam Joseph Sypniewski, Dexter, MI (US); Joshua Gevirtz, Indianapolis, IN (US); Nikola Lazar Whallon, Seattle, WA (US); Anthony John Deschamps, Windsor (CA); Scott Ivan Stephenson, Burlingame, CA (US)

(73) Assignee: Deepgram, Inc., San Francisco, CA (US)

( * ) Notice: Subject to any disclaimer, the term of this patent is extended or adjusted under 35 U.S.C. 154(b) by 322 days.

(21) Appl. No.: 17/965,960

(22) Filed: Oct. 14, 2022

(65) Prior Publication Data

US 2024/0127819 A1     Apr. 18, 2024

(51) Int. Cl.
*G10L 15/26*    (2006.01)
*G10L 15/30*    (2013.01)

(52) U.S. Cl.
CPC ............. *G10L 15/26* (2013.01); *G10L 15/30* (2013.01)

(58) Field of Classification Search
CPC ................................ G10L 15/26; G10L 15/30
USPC ....................................................... 704/235
See application file for complete search history.

(56) References Cited

U.S. PATENT DOCUMENTS

| 11,216,895 B1 * | 1/2022 | Schwartz | G06F 16/248 |
| 2020/0210852 A1 * | 7/2020 | Igartua | G16B 30/10 |
| 2021/0399911 A1 * | 12/2021 | Jorasch | H04L 12/1818 |
| 2021/0400142 A1 * | 12/2021 | Jorasch | H04L 65/1069 |
| 2023/0384916 A1 * | 11/2023 | Sadeh | G06F 3/04817 |

(Continued)

FOREIGN PATENT DOCUMENTS

| JP | 2023545702 A * | 10/2023 | ......... G06Q 10/0631 |
| RU | 2337497 C2 * | 10/2008 | ....... H04L 29/06027 |

OTHER PUBLICATIONS

D. Xu et al., "Edge Intelligence: Empowering Intelligence to the Edge of Network," in Proceedings of the IEEE, vol. 109, No. 11, pp. 1778-1837, Nov. 2021, doi: 10.1109/JPROC.2021.3119950. keywords: (Training data; Data privacy; Systematics; Edge computing; Data collection; Market research; Artificial intel (Year: 2021).*

*Primary Examiner* — Bharatkumar S Shah

(74) *Attorney, Agent, or Firm* — Cognition IP, P.C.; Edward Steakley; Saleh Kaihani

(57) ABSTRACT

Modern automatic speech recognition (ASR) systems can utilize artificial intelligence (AI) models to service ASR requests. The number and scale of AI models used in a modern ASR system can be substantial. The process of configuring and reconfiguring hardware to execute various AI models corresponding to a substantial number of ASR requests can be time consuming and inefficient. Among other features, the described technology utilizes batching of ASR requests, splitting of the ASR requests, and/or parallel processing to efficiently use hardware tasked with executing AI models corresponding to ASR requests. In one embodiment, the compute graphs of ASR tasks are used to batch the ASR requests. The corresponding AI models of each batch can be loaded into hardware, and batches can be processed in parallel. In some embodiments, the ASR requests are split, batched, and processed in parallel.

20 Claims, 8 Drawing Sheets

(56) References Cited

U.S. PATENT DOCUMENTS

2024/0046642 A1* 2/2024 Jorasch .................. G06V 40/10
2024/0055004 A1* 2/2024 Ankur ..................... G10L 15/30

* cited by examiner

HARDWARE EFFICIENT AUTOMATIC SPEECH RECOGNITION

BACKGROUND

Field

This invention relates generally to the field of artificial intelligence, and more particularly to efficient use of hardware in artificial intelligence conversion of audio to text.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Automatic speech recognition (ASR) systems exist and can have a variety of useful applications. ASR systems receive an audio input and can produce a transcript of the received audio. Some ASR systems utilize artificial intelligence (AI) models to detect words, phonemes or other units of speech and convert an audio file to a corresponding text file. Recent advancements in the field of ASR have made the underlying AI models more tailored to users, tasks, domains, or other fields of use. More customized AI models can translate to an exponential increase in the number of AI models used in an ASR system. Whereas in more traditional ASR systems, a handful of AI models were applied to ASR tasks, modern ASR systems can have a variety of customized AI models more tailored to the variety of the ASR tasks they service.

At the same time, advancements in hardware technology have provided hardware that can process AI models more efficiently, typically by increasing parallel processing capabilities of specialized processors. Still, the process of configuring and reconfiguring hardware with various AI models can be time consuming and inefficient. In modern ASR systems, a particular customized AI model may have to be quickly deployed to service an ASR request. Furthermore, the number and scale of ASR requests serviced by an ASR system can be substantial.

Traditional ASR systems utilize a few AI models and manage the process of loading and reloading hardware with an applicable AI model with relative ease. However, as the number of ASR requests and their corresponding AI models increase and the complexity of the hardware increases, the traditional ASR systems can be overwhelmed by the volume and scale of the modern ASR operations. Consequently, there is a need for modern ASR systems that can handle the scale and the volume presented in modern applications.

SUMMARY

The appended claims may serve as a summary of this application.

BRIEF DESCRIPTION OF THE DRAWINGS

These drawings and the associated description herein are provided to illustrate specific embodiments of the invention and are not intended to be limiting.

DETAILED DESCRIPTION

Figure 1:
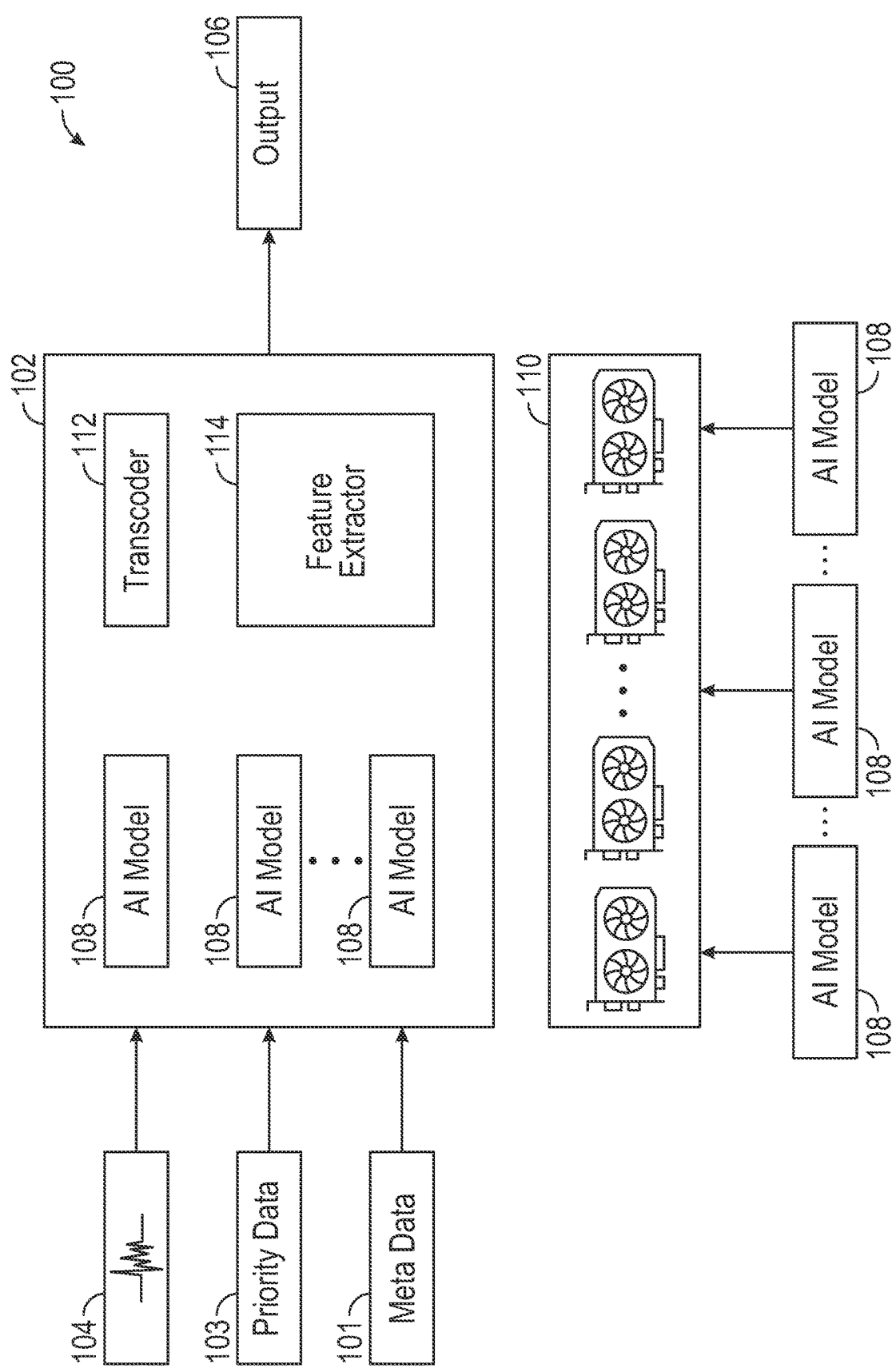
FIG. 1 illustrates a diagram of input/output and some components and operations of an ASR system according to an embodiment.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

Advancements in the field of artificial intelligence (AI) have opened up a variety of new technological applications. Several automatic speech recognition (ASR) fields can take advantage of artificial intelligence. Examples include natural language processing (NLP), natural language understanding (NLU), dialogue management, conversational AI and similar fields. Artificial Intelligence models deployed in these fields can perform a variety of speech to text processing and conversion. At the same time, advancements in hardware have introduced promising special-purpose computers and hardware which can execute these artificial intelligence models more efficiently in the field of ASR.

Some advanced devices can be particularly suited for efficient processing of audio and speech data. For example, most ASR systems can benefit from hardware architectures that can process substantial amounts of data using parallel processing. Examples of advanced devices useful for processing AI models of an ASR system include graphics processing units (GPUs), tensor processing units (TPUs) and the like.

Current approaches to utilizing hardware for speech processing includes configuring the hardware with an AI model corresponding to a speech processing task and feeding the input and/or training data to the hardware and receiving an output, typically in the form of a transcript or text form of an input audio. Traditional approaches to ASR inferencing may use a pipeline of AI models, which incrementally and serially build toward an ASR output. The ASR systems using this approach can be difficult to train and can have an artificial ceiling on accuracy. Another approach is to use an end-to-end (E2E) model, which can accept audio input, and/or features derived from an audio input, and produce an ASR output. In either approach, a dedicated hardware can be configured to execute the string of AI models in the pipeline or the single E2E model. In this scenario, the ASR system, loaded into a dedicated hardware, can be inflexible in relation to the hardware and/or software ability to quickly and efficiently execute alternative AI models, in case of receiving a speech processing task incompatible with the loaded AI model(s). In particular, in modern applications, ASR systems are called upon to execute a substantial number of diverse AI models. For example, in modern applications, the number of ASR requests, received by an ASR system can be in the order of thousands, hundreds of thousands or millions, where each request may require multiple and varying AI models to perform the underlying ASR tasks. Example ASR tasks or requests can include requests to transcribe audio clips from one language or one accent to audio transcripts of those clips or transcribing an incoming audio stream to a transcript of the audio stream.

As an example, one area of application of ASR systems is in the area of business intelligence (BI). Companies can have substantial storage of recorded business calls, which can be an invaluable source of business intelligence analytics. A robust ASR can receive the business's audio calls in stored or real-time format and convert them to text files. The text files can be processed through BI analytics pipelines to yield insight and data to the business.

In this and similar environments, the number of AI models that are to be executed can reach in the order of millions. An imperfect analogy can be made in the case of the evolution of the feature of "auto correct" in modern smartphones and computers. In the earlier days of the advent of the "auto correct" feature, potentially a large number of users deployed the same "auto correct" model. As the "auto correct" feature advanced, it became more customized and specialized for the users, where each user was allocated his or her own "auto correct" model, based on a variety of factors applicable to that user. A similar, but more challenging evolution is occurring in the field of ASR, where, in modern applications, each user of an ASR system may have specialized, or customized AI models, which are to be executed, depending on the type of ASR task requested by the user.

The modern environment of speech processing, particularly the requirement of running thousands or millions of custom AI models, presents a challenge for the ASR systems, which are inflexible in their ability to run multiple AI models on the same hardware. For example, traditional ASR systems are set up on hardware to run a pre-determined selection of a series of AI models or a few E2E models. These types of ASR systems can be slow or simply inapplicable in the modern environment, where the ASR system has to be flexible to re-set up to run alternative AI models in a short amount of time (e.g., in milliseconds).

The described embodiments include systems and methods that can determine which AI models are required to service a request (e.g., an ASR task), dynamically assemble a compute graph (CG) to service the request and swap the AI models on one or more hardware modules to service the request. The process of swapping AI models in and out of a hardware module (e.g., a GPU and/or TPU) can be referred to as "hot-swapping models on-demand." This allows a single piece of software to adapt to a large range of possible user requests without sacrificing latency or throughput metrics.

FIG. 1 illustrates a diagram 100 input/output and some components and operations of an ASR system 102 according to an embodiment. The ASR system 102 can receive an input audio 104, use a plurality of AI models 108 and produce an output 106. The output 106 can be a transcript of the input audio 104. The input audio 104 can be a pre-recorded audio input, such as an audio clip or a collection of audio clips, or it can be a streaming input, for example, an audio stream received from a microphone. In some implementations, the ASR system 102 is implemented in the clouds and provides audio transcription services. Users can provide input audio 104 and request an ASR task, such as a transcript of the input audio 104. In some implementations, the user request to the ASR system 102 can include priority data 103. Some ASR tasks may have higher priority, for example, a user dictating text into an ASR system via a streaming input may require the output sooner than a user who is inputting pre-recorded audio files into the ASR system for later analysis. As part of receiving an ASR task, the ASR system 102 can receive priority data 103 of a request along with input audio 104.

In some embodiments, the ASR system 102 can be implemented in a cloud infrastructure, where users can make application programming interface (API) calls to the ASR system 102 to request service for ASR tasks. The requests can include requests for transcribing audio files in various languages, accents, from pre-recorded audio files and/or from streaming audio files send to the ASR system 102 via an API call. In some embodiments, the administrator of the ASR system 102 can provide a software development kit (SDK) to users of the ASR system 102 to make API calls to the ASR system 102. Consequently, the ASR system 102 can integrate with external software and can receive hundreds of thousands of calls/requests for different ASR tasks per minute. The ASR tasks can also relate to different domains, languages, and other differing characteristics, requiring a variety of different AI models 108 to serve those requests. As described earlier, this environment can necessitate an exponential number of AI models to service the ASR task requests.

The ASR system 102 may utilize the hardware modules 110. The AI models 108 can be loaded into the hardware modules 110 to service an ASR task received by the ASR system 102. In some embodiments, the AI models 108 can be numerous, for example in the order of thousands, or millions of AI models for a large number of users of the ASR system 102. Not all models that may be needed to service an ASR request can be resident on the hardware modules 110 at once. The described embodiments include systems and methods to load and unload the AI models 108 in an efficient manner to take advantage of the parallelism in speech and audio processing tasks that can exist when servicing requests from thousands or millions of users of the ASR system at the same time. Additionally, in some embodiments, the described systems and methods employ the hardware modules 110 to service incoming ASR task requests in the order of priority indicated in an incoming ASR request.

Furthermore, the ASR system 102 can include transcoder 112 and feature extractor 114. The transcoder 112 and feature extractor 114 can perform their operations depending on the requirements of the AI models 108 used to service an ASR request. For example, the transcoder 112 can modify the sampling rate of the input audio 104, depending on the requirements of an AI model 108 tasked with processing the input audio 104. In some cases, using multiple models to service an ASR task can correspond to the transcoder 112 generating multiple transcodes of the input audio 104. Similarly, the feature extractor 114 can extract different features from the input audio 104, depending on the required parameters of the AI model(s) 108, tasked with processing the input audio 104.

The hardware modules 110 can include general-purpose components and/or specialized components optimized to handle parallel loads, encountered in the environment of the ASR systems. For example, GPUs and/or TPUs can be used to implement the functionality of the hardware modules 110. In some embodiments, the hardware modules 110 can include subcomponents, such as GPU workers and the like.

Compared to the environment of the ASR system 102 described above, many existing ASR systems are based on serial processing of a limited number of ASR requests through a handful of AI models. In these traditional systems, ASR requests are processed in a serial manner, where when one request is being processed through the AI models and the underlying hardware, other requests are sitting idle, or have to wait in a queue. When a new request is to be processed, the process of setting up the underlying hardware with new AI models corresponding to the new request can take hours in some cases. In other existing ASR systems, dedicated hardware for a handful of models may be used. By contrast, the described embodiments, take advantage of parallelization and process multiple requests at a time, where the hardware modules 110 can be configured with multiple AI models 108 which can process ASR requests or portions of ASR requests from multiple users at a time. For example, if two or more requests or portions of two or more requests can be processed through an AI model 108 resident in a hardware module 110, those requests or portions are processed together, without having to reload the corresponding AI model 108 at a later time.

Furthermore, in traditional ASR systems, the process of resetting the hardware with models corresponding to a new ASR task, while future ASR tasks await their turn, can frequently lead to resetting the hardware with the AI models that were recently removed from the hardware only within a few ASR tasks ago. The serial loading and reloading of the same AI models during ASR operations can lead to inefficiency and loss of time and resources in utilizing an available hardware. The described embodiments, on the other hand, can reduce or minimize the unnecessary removal of AI models from the hardware, allowing for more ASR tasks to be received and processed simultaneously. In some embodiments, ASR requests or portions of ASR requests can be processed out of order to take advantage of parallelization. The out-of-order outputs can be later assembled in the correct order and outputted. These, and other features of the described embodiments, illustrate the scale advantage of the described embodiments, relative to traditional ASR systems. The transcoder 112 and feature extractor 114 are example subcomponents of the ASR 102. The ASR 102 can include additional components that are not listed.

Figure 2:
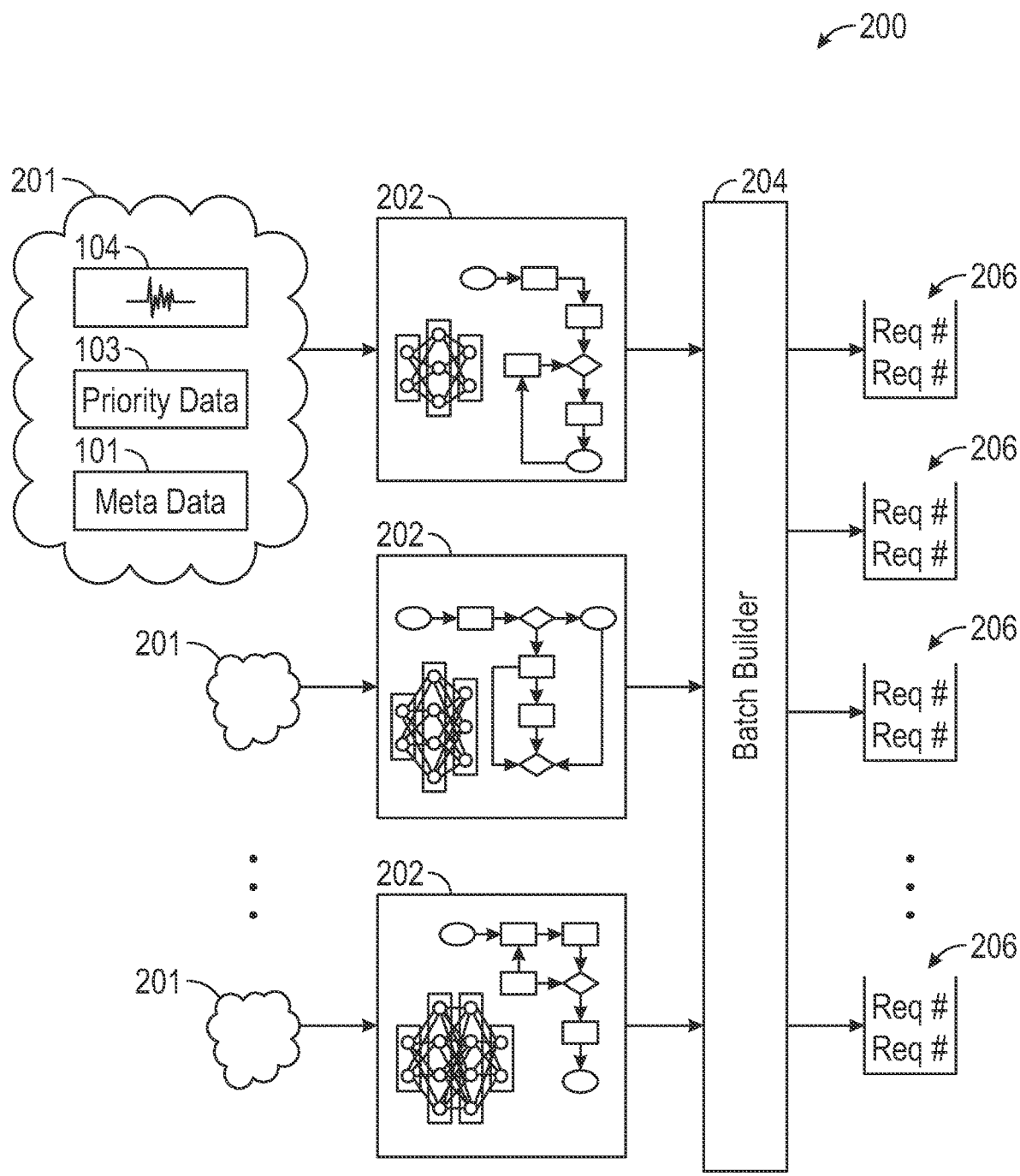
FIG. 2 illustrates a pipeline of the operations of an ASR system according to an embodiment.
Figure 2:
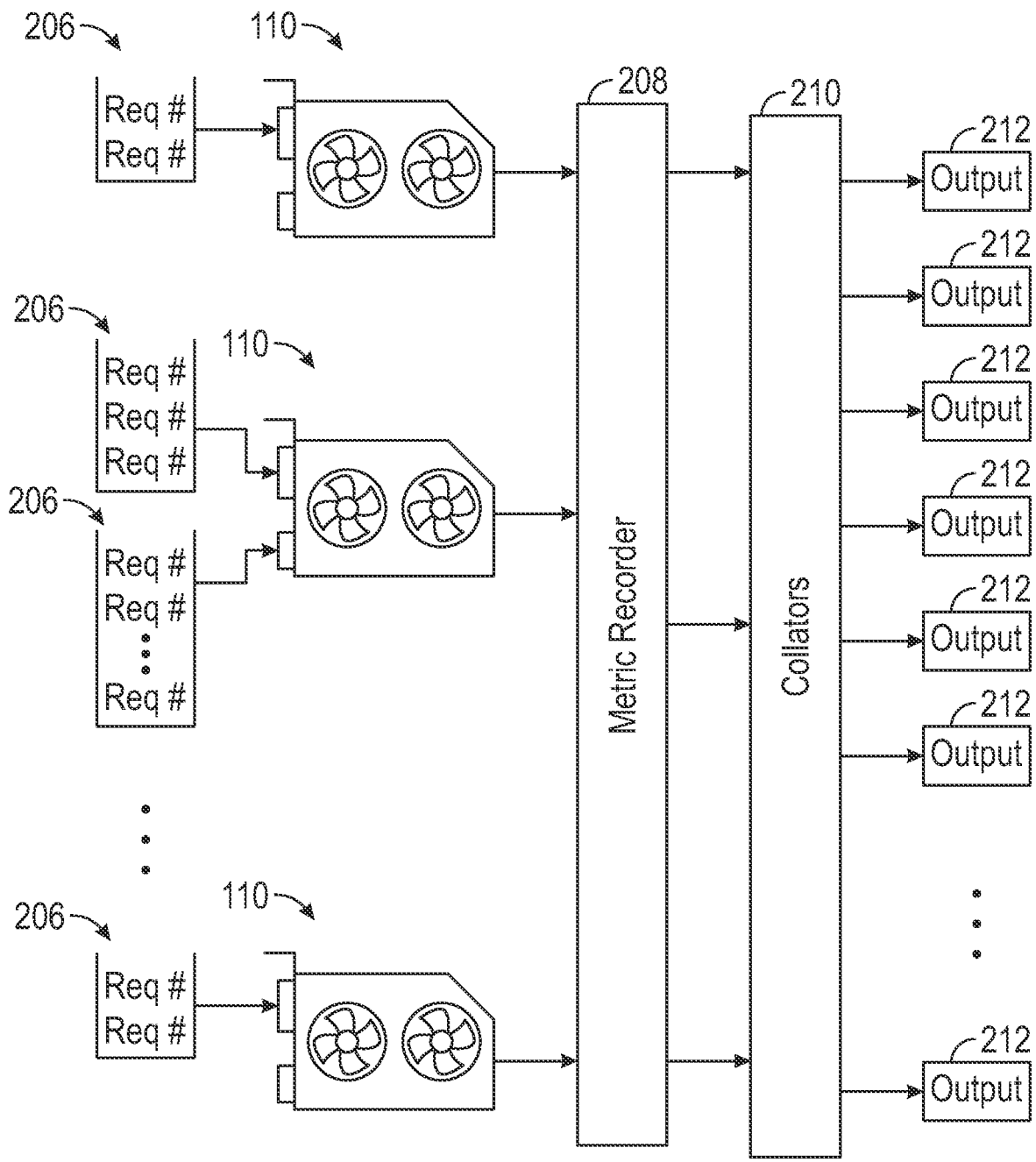

FIG. 2 illustrates a pipeline 200 of the operations of the ASR system 102 according to an embodiment. Requests 201 are received at the ASR system 102. The requests 201 can include meta data 101, priority data 103 and the input audio 104. The meta data 101 can include meta data of the request 201, such as the preferred language, preferred domain, or any other data that the sender of the request might provide to identify the sender and to assist or otherwise be used to configure the ASR system 102 to process the request. In one aspect, the requests 201 can include requests for processing pre-recorded audio files and/or requests for processing streaming audio files. The sender of a request 201 can indicate a maximum tolerance for delay in receiving the output of processing a request 201, expressed in the priority data 103.

The ASR system 102 can generate a compute graph (CG) 202 for each request 201. A compute graph 202 is a map of series of operations to service a request 201. Generating a CG 202 can include determining AI models 108 applicable to processing a request 201. Other operations of a CG 202 can include preparing the input audio 104 and/or extracting features from the input audio 104, as may be required by the AI models 108 in the CG 202. For example, some AI models 108 may require their input to be in a particular sampling rate, other than the sampling rate in which the input audio 104 was received. Some AI models 108 may require a particular set of audio features of an input audio 104. In these instances, the transcoder 112 and the feature extractor 114 can prepare and provide the input as required by an AI model 108.

The ASR system 102 can perform batching operations on each request 201 based on the corresponding CG 202 of each request 201. A batch builder 204 categorizes each request 201 into a batch 206. In some embodiments, each batch 206 is determined based on AI model(s) 108 used by a request 201 and/or the priority data 103 of a request 201. In some embodiments, the priority data 103 can be a maximum latency tolerance associated with a request 201. In some embodiments, the requests 201 in a batch 206 match in the AI models 108 that they use and the priority data 103. In other embodiments, the batch builder 204 can bucketize the requests 201, based on any selected set of constraints, such as the AI models 108 used, the priority data 103, a combination of these two constraints or other constraints. In some embodiments, the requests 201 can be batched or bucketized based on a mode parameter of the request. The mode parameter can indicate whether the request is a request for transcribing a pre-recorded audio file or a request for transcribing an audio stream. In other words, in one aspect, the requests 201 can, for example via meta data 101, include a mode parameter indicating "pre-recorded" or "streaming" nature of the input audio 104. The mode parameter can in turn determine which AI models 108 are to be used in CG 202 and to which batch a request would belong.

The ASR system 102 can assign hardware modules 110, for example GPU workers, to processing the batches 206. The assignment of batches 206 to hardware modules 110 can be based on a variety of factors, including the hardware requirements of the AI models 108 of a batch 206 and/or priority data 103 of a batch 206. After assigning a hardware module 110 to a batch 206, the ASR system 102 can load the AI models 108 of the batch into the hardware module 110 and can start pushing the processing of the requests 201 in a bath 206 to its assigned hardware module 110. Depending on the capacity of an assigned hardware module 110, more than one request can be processed at a time. Once the capacity of the hardware module 110 frees up, the processing of a subsequent request from a batch 206 can be pushed to the hardware module 110. In this manner, the hardware module 110 need not be reconfigured with new AI models to process a subsequent request 201. The processing of the requests 201 in a batch 206 can continue in this manner, as long as additional requests arrive and are placed in the batch 206. In other words, the pipeline 200 can continuously process requests 201 by batching them and pushing their processing to an assigned hardware module 110. Furthermore, using the ASR system 102, in a modern ASR environment, where the same or similar ASR tasks can be received from thousands or millions of users, the ability of the hardware modules 110 to immediately or near-immediately process those requests, without having to reconfigure for every request, is substantially improved.

In some embodiments, pushing the processing of a batch 206 to a corresponding hardware module 110 can be based on priority data 103. For example, a hardware module 110 can be setup with an AI model 108. A first and second batch 206 can be processed by the hardware module 110, loaded with the AI model 108, but the first batch 206 can be of higher priority and the second batch 206 can be of lower priority. In this scenario, the higher priority batch 206 is processed by hardware module 110 first and then the second batch 206, having lower priority is processed by the hardware module. In other words, a hardware module 110 can be loaded with an AI model 108, which several batches can use, but the priority data 103 can be used to determine which batch 206 is processed first.

In some embodiments, a metric recorder module 208 can record data associated with the operation of the pipeline 200. The recorded metrics can include operations to record the latency of each hardware module 110 in processing each request. In some embodiments, the metric recorder 208 provides a snapshot of the operations of the pipeline 200 and can provide insight for processing future batches. For example, idle hardware modules 110 can be assigned more requests and long-latency hardware modules 110 can be assigned fewer requests in subsequent batches. However, the metric recorder 208 is not necessary in every embodiment.

In some cases, a processing of an entirety of a request 201 cannot fit on a hardware module 110. In other cases, greater efficiencies can be realized by taking advantage of parallelization by breaking up a larger request and its associated processing across multiple hardware modules 110. Consequently, in some embodiments, the ASR system 102 applies "chunking," which refers to splitting a request to smaller pieces or chunks. When chunking is applied, the processing of the requests 201 can occur out-of-order. One or more collators 210 can put the output of the processing of the chunks back in order. However, the collators 210 are not necessary in every embodiment. If chunking is not used, the pipeline 200 does not include the collators 210. The pipeline 200 generates the output 212, which can be a transcript or text file of the input audio 104.

Figure 3:
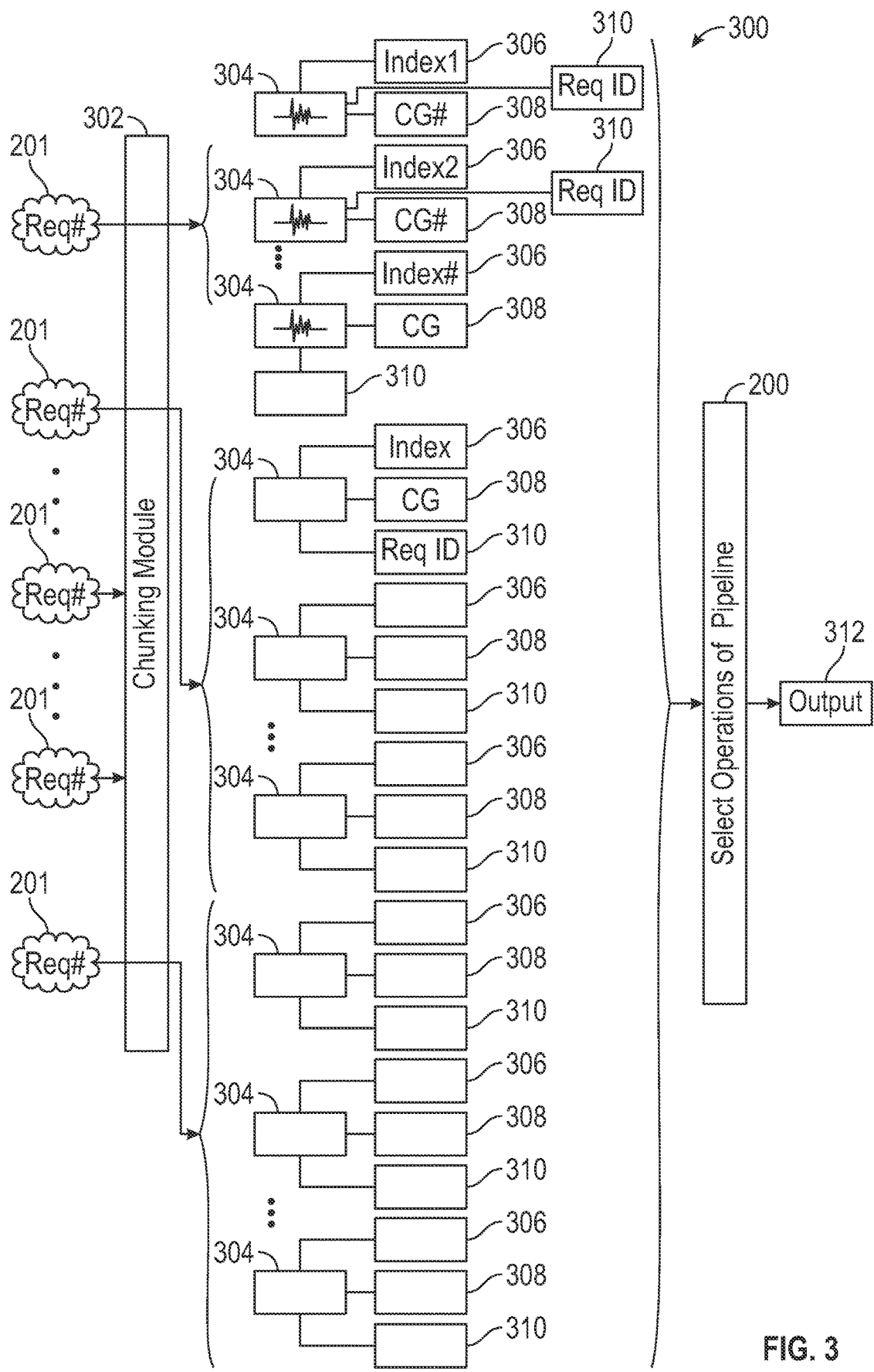
FIG. 3 illustrates a diagram of the chunking operations, which can be performed by an ASR system according to an embodiment.

FIG. 3 illustrates a diagram 300 of the chunking operations, which can be performed by the ASR system 102. Requests 201 can be split using a chunking module 302. The chunking module 302 can split each request 201 into chunks 304. In some embodiments, the chunking module 302 splits the input audio 104 in the requests 201. In other embodiments, the chunking can be performed in relation to other aspects of a request 201, such as a selected feature space related to the input audio 104. When audio files 104 are split, the splitting can be based on a selected time interval. For example, each chunk 304 can be a ten-second interval of the input audio 104 in a request 201. The chunks 304 can be indexed with index labels 306 to maintain a record of their order in the original request 201. The index labels 306 can be used by collators 210 in the pipeline 200 to reassemble the output of the processing of the chunks. For example, the first ten-second interval of an input audio 104 can be indexed with index label number "1," the second ten-second interval of input audio 104 can be indexed with index label number "2" and so forth. The index label 306 for a chunk 304 can be applied to the output of the processing of a chunk 304. In this manner, the outputs of the processing of the input chunks 304 can be assembled in the same order as the input chunks 304, using index labels 306.

In some embodiments, prior to chunking operations, a compute graph 202 of a request 201 can be generated. Using the compute graph 201 associated with a request 201, the chunking module 302 can tag the chunks 304 with a compute graph tag 308. The compute graph tags 308 can be used by batch builder 204 to assign a chunk 304 to a batch 206. Furthermore, the chunks 304 can be tagged with a request identifier 310. The request identifiers 310, along with the index labels 306 can be used to assemble the output of the processing of a request 201. The chunks 304, having index labels 306, compute graph tags 308 and request identifiers 310 can be processed using select operations of the pipeline 200. For example, the chunks 304 can be batched using the batch builder 204, generating batches 206. The batches 206 can be assigned to a corresponding hardware module 110, based on the compute graph tags 308. In some embodiments, the metric recorders 208 can be used to capture and record various metrics of the operations of the pipeline 200. Examples of such metrics include performance metrics of the hardware modules 110. In some embodiments, the metrics can be used to further improve the efficiency of the pipeline 200 in processing subsequent batches 206. For example, hardware module 110 assignment and/or load for a hardware module 110 can be modified, based on data from the metric recorder 208. After the chunks 304 are processed by hardware modules 110. The collators 210 can use the index labels 306 and the request identifiers 310 to assemble the output 312 of the processing of a request 201.

Figure 4:
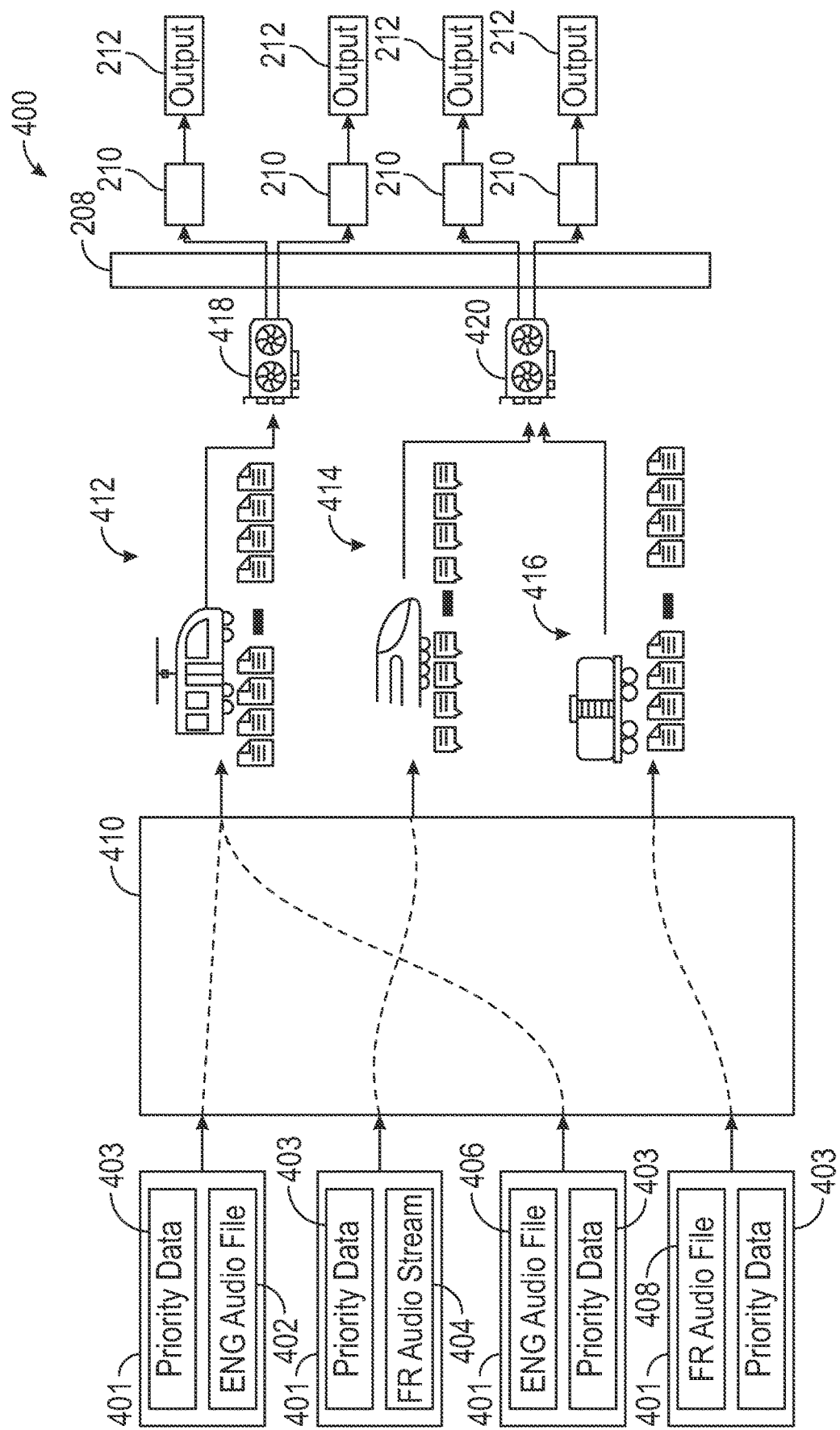
FIG. 4 illustrates a diagram of an example operation of an ASR system according to an embodiment.

FIG. 4 illustrates a diagram 400 of an example operation of an ASR system according to an embodiment. Input requests 401 can include requests for transcribing a first English audio file 402, a French audio stream 404, a second English audio file 406, and a French audio file 408. The audio files 402, 406 and 408 can be from a previously recorded database of audio files that are not necessarily transmitted into the ASR system in real-time, relative to the time of recording. By contrast, audio streams, such as the French audio stream 404, can be provided to the ASR system in real-time, for example, from a microphone. The mode parameters of the requests having audio files 402, 406 and 408 are "pre-recorded," while the mode parameters of the audio streams, such as the French audio stream 404 are "streaming" or "stream." The requests 401 can also include priority data 403.

The compute graphs of the audio files and audio streams 402-408 are generated. A batch builder 410 can batch the requests and/or audio files and streams in the requests, based on their respective compute graphs. The batching can be in relation to the AI model(s) used in each compute graph. In some embodiments, the batching can also be based on the priority data 403 of each request 401. In this scenario, if a request 401 does not contain priority data 403, the ASR system can assign a default priority data 403 to the request. The default priority of a request can be a latency or a time period less than higher priority requests. In some implementations, requests received in streaming mode, for example the French audio stream 404, can generally have higher priority data. Requests containing an audio stream can be from users requesting transcription of a stream in real time, which can correspond to these requests having a higher priority than audio files in pre-recorded mode.

In the example shown in diagram 400, the audio files and streams 402-408 can be batched into three batches. A medium priority batch 412 can include requests which can be processed by AI model(s) configured to transcribe pre-recorded English audio files with priority data 403 of around 100 milliseconds. A high priority batch 414 can include requests which can be processed by AI model(s) configured to transcribe French audio streams with priority data 403 of around 50 milliseconds. A low priority batch 416 can include requests which can be processed by AI model(s) configured to transcribe pre-recorded French audio files with priority data 403 of around 1000 milliseconds. In some embodiments, the AI model(s) between the batches can be the same, while the priority data 403 of the batches can be different. In the example shown in the diagram 400, the high priority batch 414 and the low priority batch 416 can share the same AI model(s) configured to transcribe French.

The batching based on priority data can be implemented in a variety of ways. For example, in some embodiments, each batch can encompass a range of requests with similar priority data. In the example shown, the medium priority batch 412 can encompass requests having priority data in the hundreds of milliseconds. The high priority batch 414 can encompass requests having priority data in the tens of milliseconds, and the low priority batch 416 can encompass requests having priority data in the thousands of milliseconds. The priority data can correspond to the latency by which a user expects to receive the output of the ASR system in response to a request submitted by the user. The number of batches and priority ranges outlined herein are provided as examples. Persons of ordinary skill in the art can envision fewer or more batches and different ranges in various implementations.

In the example shown in diagram 400, the ASR system can load one or more AI models corresponding to the batches 412-416 to one or more hardware modules, such as the GPU workers 418, 420. In the example shown, the high and low priority batches 414, 416 can share the same AI model(s) for transcribing French. In this scenario, the GPU worker 420 can be a shared hardware module, loaded with the AI model(s) corresponding to the low and high priority batches 414, 416. In other words, in some embodiments, the ASR system can determine which batches use the same AI model(s) and load the shared AI model(s) into a shared hardware module. The ASR system can push the processing of the requests in the batches sharing AI model(s) to a GPU worker, for example GPU worker 420, based on the priority data of each batch. For example, requests in the high priority batch 414 can take priority over requests from the low priority batch 416. Consequently, the processing of requests in the high priority batch 414 is performed ahead of the processing of the requests in the low priority batch 414. A second GPU worker, the GPU worker 418 can be loaded with AI model(s) configured to transcribe English. In this scenario, the processing of requests in the medium priority batch 412 can be pushed to the GPU worker 418. In diagram 400, batches 412-416 are illustrated in part by icons of trains of various speeds to visually distinguish the different priority data of the batches 412-416.

The ASR system aims to keep the GPU workers 418, 420 occupied if there are requests to be processed in any batch. Therefore, the processing of the requests is also based on time of arrival (TOA) at the ASR system and/or at the batches 412-416. For example, when the GPU worker 420 is available and there is no request in the higher priority batch 414, but there are requests in the low priority batch 416, the GPU 420 processes the low priority requests from the low priority batch 416. When a new high priority request is placed in the high priority batch 414, the GPU worker 420 allocates its next available capacity to the new high priority request. In this manner, the ASR system maintains full or near full utilization for hardware modules, such as the GPU workers 418, 420 and reduces or minimizes hardware idle time.

Figure 5:
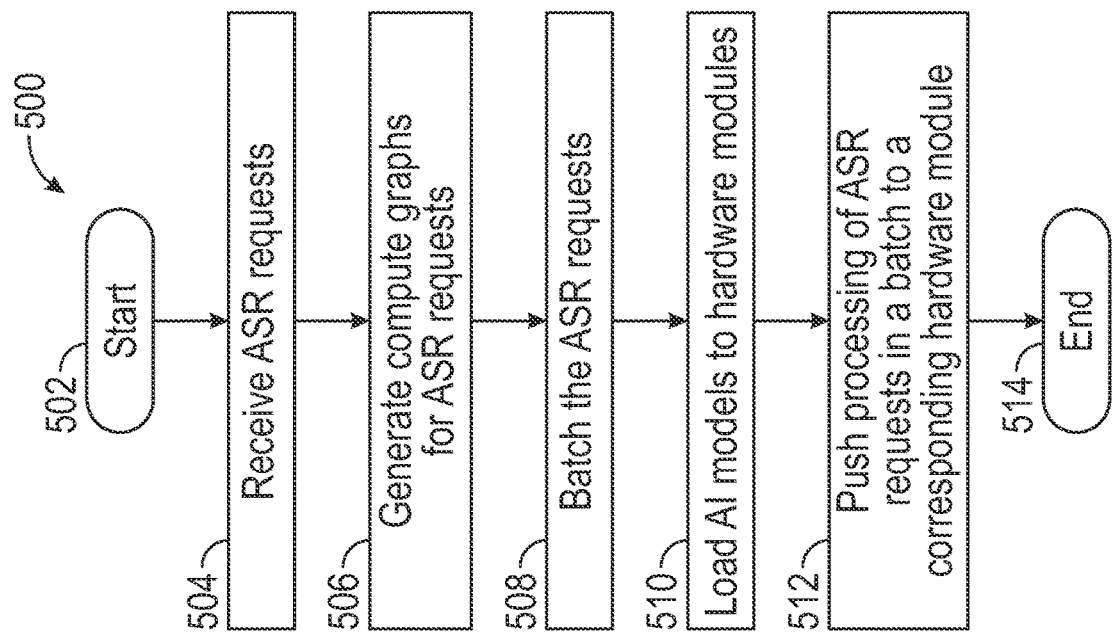

FIG. 5 illustrates a flowchart of an example method 500 of operation of an ASR system according to an embodiment. The method starts at step 502. At step 504, the ASR system receives a plurality of ASR requests. In some applications, the step 504 may be continuously occurring, where the ASR system continuously receives ASR requests from a plurality of users. At step 506, the ASR system generates a compute graph for each ASR requests. At step 508, the ASR system batches the ASR requests, based on the AI models used in the compute graph of the ASR request. For example, ASR requests can be batched based on AI models corresponding to a language of transcription (e.g., English, French, etc.) or they can be batched based on domain (e.g., scientific, educational, art, etc.). In other words, the ASR system can use nearly unlimited ASR AI models to batch incoming ASR requests received at step 504, depending on the implementation. The batching can also be based on other criteria or a selected set of constraints. Consequently, it is possible, in some embodiments, that some batches share AI models, but differ in other aspects.

At step 510, the ASR system can load the AI models corresponding to the batches to one or more hardware modules. At step 512, the ASR system pushes the processing of the ASR requests in a batch to a corresponding assigned hardware module. This does not necessarily mean that there has to be a one-to-one correspondence between hardware modules and the AI models of the batches. Depending on availability and capacity of the hardware modules, the ASR system can dedicate a hardware module to one or more AI models. In some cases, all potential AI models for incoming ASR tasks or requests cannot be simultaneously resident on the hardware. In this scenario, the ASR system can offload, from hardware, the AI models for which there is no corresponding batch or received ASR requests. The hardware can be loaded with AI models of batches for which there is a corresponding ASR request. In other words, if a batch is empty, the corresponding AI models of the batch can be offloaded from the hardware and AI models of non-empty batches can be loaded into the hardware. However, if there is more hardware availability than the batches, then the ASR system can leave unused AI models resident on the hardware and deploy the hardware as soon as an applicable ASR request is received. In cases where hardware capacity is less than the number of non-empty batches, the ASR system can process the batches and the requests therein, using the priority data of each batch and/or the requests. In some embodiments, TOA data can also be used, additionally or in lieu of the priority data, to prioritize the processing of the batches and/or the requests therein. The method ends at step 514.

Figure 6:
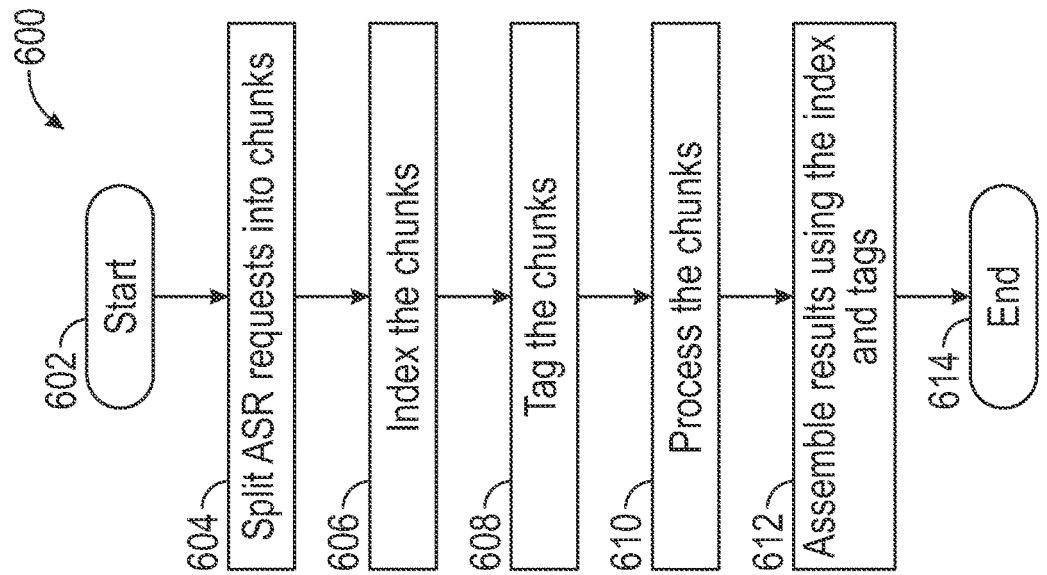
FIGS. 5-7 illustrate flowcharts of example methods of operations of ASR systems according to the described embodiments.

FIG. 6 illustrates a flowchart of an example method 600 of operation of an ASR system according to an embodiment. The method starts at step 602. At step 604, the ASR system can split a plurality of ASR requests into chunks. The chunks can be intervals of the input audio in each request. At step 606, the chunks are labeled with index labels to keep a record of their order in the original request. For example, the first ten-second interval of input audio is labeled with the index label "1," the second ten-second interval of input audio is labeled with the index label "2" and so forth. At step 608, the chunks are tagged with a corresponding compute graph tag. The chunks can also be tagged with a request identifier to keep a record of the association of the chunks with their originating requests. At step 610, the chunks are processed in the ASR system, for example, by applying the operations of the method 500, as described above. The compute graph tags can be used to batch the chunks and further process the chunks in the ASR system pipeline. The chunks can and may be processed out of order, based on availability of their corresponding assigned hardware module. The same index labels and request identifiers of the chunks present at the input, are applied to the output of the processing of the chunks. At step 612, the index labels and the request identifiers can be used to assemble an output for the processing of each request. For example, all outputs of processing of the chunks, having the same request identifier, are accumulated, and assembled in the order indicated by their index labels. The assembled result is outputted as the output of the processing of a request. The method ends at step 614.

Figure 7:
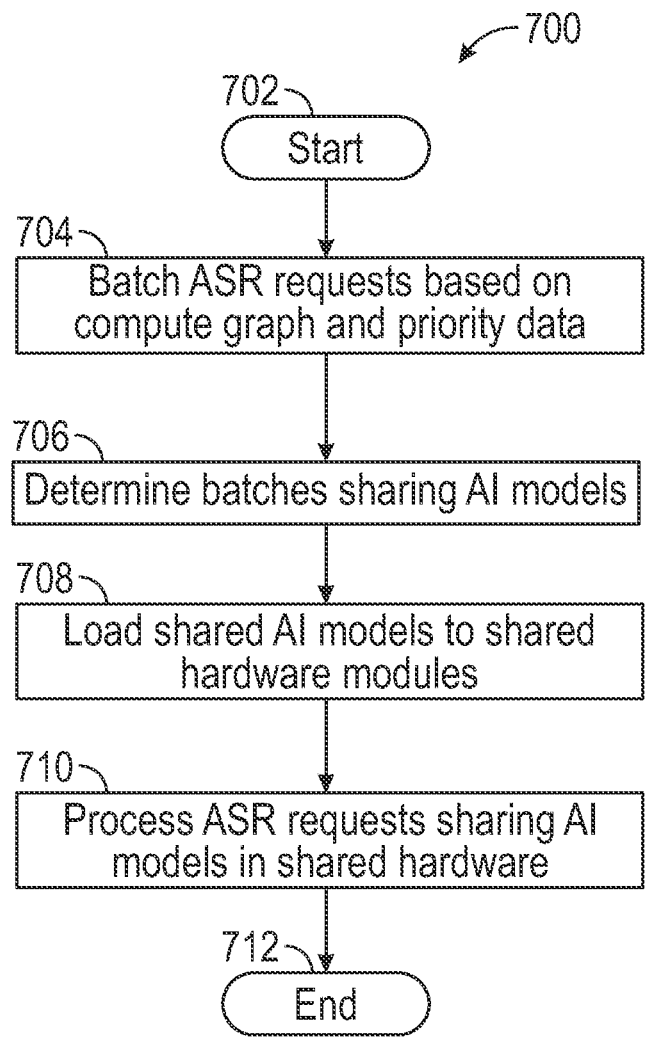

FIG. 7 illustrates a flowchart of an example method 700 of operation of an ASR system according to an embodiment. The method starts at step 702. At step 704, the ASR system batches a plurality of ASR requests based on the compute graph of each request and the priority data of each request. In some embodiments, selected ranges of priority data can be used to batch the requests. For example, three range of priority data can be assigned to low, medium, or high priority, corresponding respectively to low, medium and high priority batches. At step 706, the ASR system can determine which batches share AI models. The ASR system can assign a common hardware module or a shared hardware module to the batches sharing AI models. At step 708, the ASR system can load the AI models to the assigned hardware modules, including loading shared AI models to the shared hardware modules. For example, a GPU worker can be assigned to two batches, both containing requests for French audio transcription, albeit with different priority data. At step 710, the ASR system processes the requests in the batches in the assigned hardware modules. The processing for the batches sharing a hardware module can include prioritizing the processing of the requests in the higher priority batches. The method ends at step 712.

Example Implementation—Mechanism Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 8:
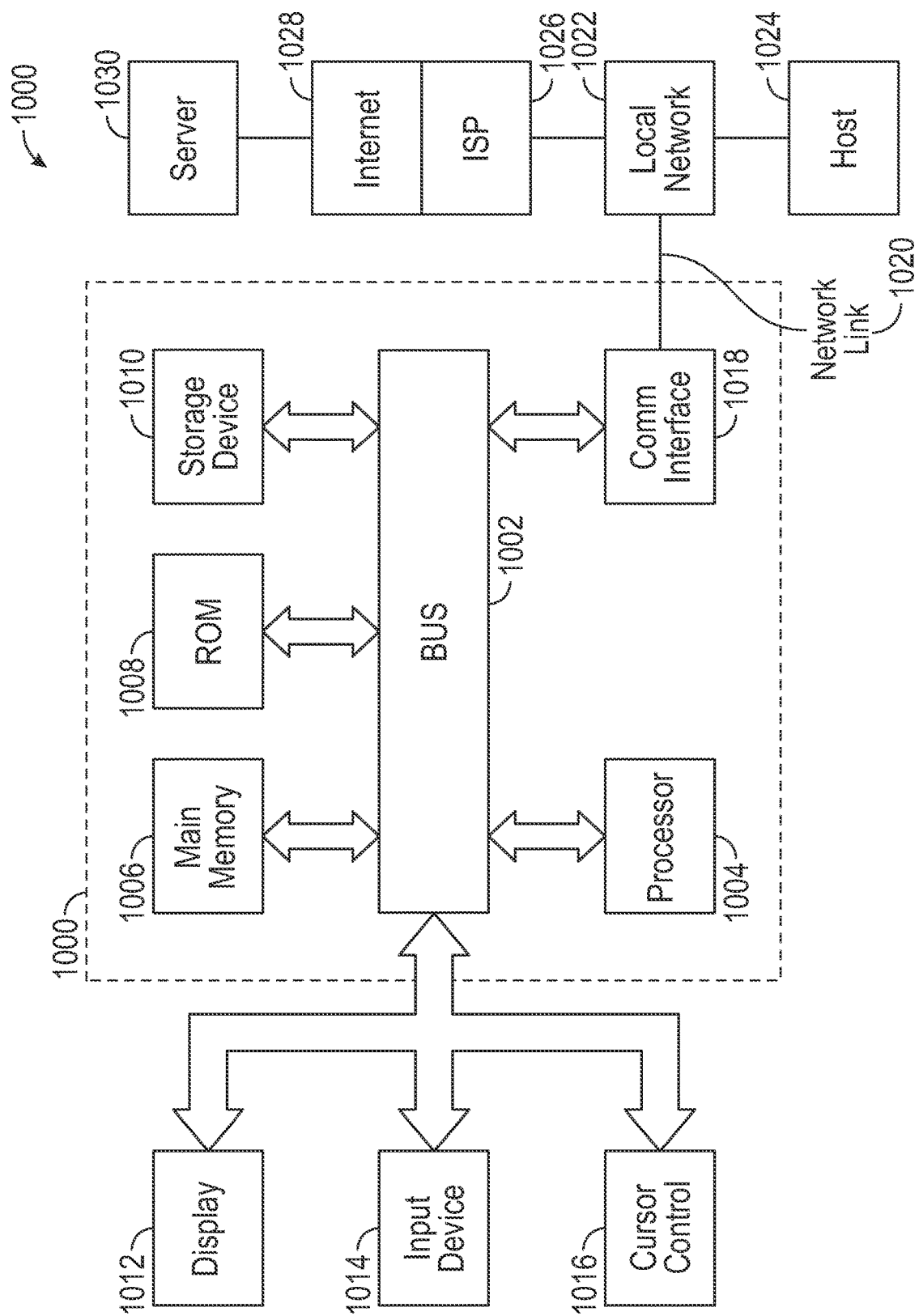
FIG. 8 is a block diagram that illustrates a computer system upon which an embodiment can be implemented.

For example, FIG. 8 is a block diagram that illustrates a computer system 1000 upon which an embodiment can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touchscreen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

EXAMPLES

It will be appreciated that the present disclosure may include any one and up to all of the following examples.

Example 1: A method comprising: receiving a plurality of requests for audio transcription from a plurality of clients; determining a compute graph for processing each request, wherein the compute graph comprises one or more artificial intelligence models; batching the requests, based on the artificial intelligence models in the compute graph; loading one or more artificial intelligence models corresponding to a batch to a hardware module; pushing a processing of a request in a batch to a corresponding hardware module loaded with an artificial intelligence model corresponding to the batch.

Example 2: The method of Example 1, further comprising: offloading, from the hardware module, artificial intelligence models not needed for processing the requests in a batch.

Example 3: The method of some or all of Examples 1 and 2, wherein batching the requests is further based on the priority of a request.

Example 4: The method of some or all of Examples 1-3, wherein the request comprises a request for automatic transcription of an audio file or an audio stream.

Example 5: The method of some or all of Examples 1-4, further comprising: splitting a request into chunks; indexing the chunks with index labels, indicating order of the chunks in the request from which the chunks split; tagging the chunks with a request identifier, identifying the request from which a chunk was split; tagging the chunks with a corresponding compute graph tag, wherein batching the requests comprises batching the chunks based on the compute graph tags and processing the requests comprises processing the chunks in hardware modules corresponding to the compute graph tags; applying the index labels and the request identifier tags of the chunks to outputs of the processing of the chunks; and for each request, assembling the outputs of the processing of the chunks tagged with the request identifier of the request, in the order indicated by the index labels.

Example 6: The method of some or all of Examples 1-5, wherein the hardware module is a graphics processing unit (GPU).

Example 7: The method of some or all of Examples 1-6, further comprising: recording metrics of the processing of the requests by the hardware module and modifying the batching based on the recorded metrics.

Example 8: The method of some or all of Examples 1-7, wherein batching further comprises batching based on priority data of a request, wherein loading the one or more artificial intelligence models corresponding to a batch comprises: determining batches sharing artificial intelligence models; loading the shared artificial intelligence models into a shared hardware module; and pushing the processing of the requests in batches sharing artificial intelligence models to the shared hardware module, based on the priority data of each batch.

Example 9: A non-transitory computer storage that stores executable program instructions that, when executed by one or more computing devices, configure the one or more computing devices to perform operations comprising: receiving a plurality of requests for audio transcription from a plurality of clients; determining a compute graph for processing each request, wherein the compute graph comprises one or more artificial intelligence models; batching the requests, based on the artificial intelligence models in the compute graph; loading one or more artificial intelligence models corresponding to a batch to a hardware module; pushing a processing of a request in a batch to a corresponding hardware module loaded with an artificial intelligence model corresponding to the batch.

Example 10: The non-transitory computer storage of Example 9, wherein the operations further comprise: offloading, from the hardware module, artificial intelligence models not needed for processing the requests in a batch.

Example 11: The non-transitory computer storage of some or all of Examples 9 and 10, wherein batching the requests is further based on the priority of a request.

Example 12: The non-transitory computer storage of some or all of Examples 9-11, wherein the request comprises a request for automatic transcription of an audio file or an audio stream.

Example 13: The non-transitory computer storage of some or all of Examples 9-12, wherein the operations further comprise: splitting a request into chunks; indexing the chunks with index labels, indicating order of the chunks in the request from which the chunks split; tagging the chunks with a request identifier, identifying the request from which a chunk was split; tagging the chunks with a corresponding compute graph tag, wherein batching the requests comprises batching the chunks based on the compute graph tags and processing the requests comprises processing the chunks in hardware modules corresponding to the compute graph tags; applying the index labels and the request identifier tags of the chunks to outputs of the processing of the chunks; and for each request, assembling the outputs of the processing of the chunks tagged with the request identifier of the request, in the order indicated by the index labels.

Example 14: The non-transitory computer storage of some or all of Examples 9-13, wherein the hardware module is a graphics processing unit (GPU).

Example 15: The non-transitory computer storage of some or all of Examples 9-14, wherein the operations further comprise: recording metrics of the processing of the requests by the hardware module and modifying the batching based on the recorded metrics.

Example 16: The non-transitory computer storage of some or all of Examples 9-15, wherein batching further comprises batching based on priority data of a request, wherein loading the one or more artificial intelligence models corresponding to a batch comprises: determining batches sharing artificial intelligence models; loading the shared artificial intelligence models into a shared hardware module; and pushing the processing of the requests in batches sharing artificial intelligence models to the shared hardware module, based on the priority data of each batch.

Example 17: A system comprising a processor, the processor configured to perform operations comprising: receiving a plurality of requests for audio transcription from a plurality of clients; determining a compute graph for processing each request, wherein the compute graph comprises one or more artificial intelligence models; batching the requests, based on the artificial intelligence models in the compute graph; loading one or more artificial intelligence models corresponding to a batch to a hardware module; pushing a processing of a request in a batch to a corresponding hardware module loaded with an artificial intelligence model corresponding to the batch.

Example 18: The system of Example 17, wherein the operations further comprise: offloading, from the hardware module, artificial intelligence models not needed for processing the requests in a batch.

Example 19: The system of some or all of Examples 17 and 18, wherein the operations further comprise: splitting a request into chunks; indexing the chunks with index labels, indicating order of the chunks in the request from which the chunks split; tagging the chunks with a request identifier, identifying the request from which a chunk was split; tagging the chunks with a corresponding compute graph tag, wherein batching the requests comprises batching the chunks based on the compute graph tags and processing the requests comprises processing the chunks in hardware modules corresponding to the compute graph tags; applying the index labels and the request identifier tags of the chunks to outputs of the processing of the chunks; and for each request, assembling the outputs of the processing of the chunks tagged with the request identifier of the request, in the order indicated by the index labels.

Example 20: The system of some or all of Examples 17-19, wherein batching further comprises batching based on priority data of a request, wherein loading the one or more artificial intelligence models corresponding to a batch comprises: determining batches sharing artificial intelligence models; loading the shared artificial intelligence models into a shared hardware module; and pushing the processing of the requests in batches sharing artificial intelligence models to the shared hardware module, based on the priority data of each batch.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A method comprising:
   receiving a plurality of requests for audio transcription;
   determining a compute graph for each request, wherein the compute graph comprises one or more artificial intelligence models;
   batching the requests, based on the artificial intelligence models in the compute graph of each request;
   loading one or more artificial intelligence models corresponding to a batch to a hardware module;
   pushing processing of a request in the batch to the hardware module, loaded with the one or more artificial intelligence models, corresponding to the batch; and
   offloading, from the hardware module, artificial intelligence models not needed for processing the requests in the batch.

2. The method of claim 1, wherein batching the requests is further based on priority data of the requests.

3. The method of claim 1, wherein the request comprises the request for automatic transcription of an audio file or an audio stream.

4. The method of claim 1, further comprising:
   splitting the request into chunks;
   indexing the chunks with index labels, indicating order of the chunks in the request from which the chunks split;
   tagging the chunks with a request identifier, identifying the request from which a chunk was split;
   tagging the chunks with a corresponding compute graph tag, wherein batching the requests comprises batching the chunks based on the compute graph tags and processing the request comprises processing the chunks in the hardware module, corresponding to the compute graph tag;
   applying the index labels and the request identifier tags of the chunks to outputs of the processing of the chunks; and assembling the outputs of the processing of the chunks, tagged with the request identifier of the request, at least in part based on the order indicated by the index labels.

5. The method of claim 1, wherein the hardware module comprises a graphics processing unit (GPU) or a tensor processing unit (TPU).

6. The method of claim 1, further comprising: recording metrics of the processing of the request, by the hardware module; and modifying the batching based on the recorded metrics.

7. The method of claim 1,
wherein batching further comprises batching based on priority data of the requests,
wherein loading the one or more artificial intelligence models corresponding to a batch comprises:
determining batches sharing artificial intelligence models;
loading the shared artificial intelligence models into a shared hardware module; and
processing the requests in batches, sharing artificial intelligence models, in the shared hardware module, based on the priority data of each batch.

8. A non-transitory computer storage that stores executable program instructions that, when executed by one or more computing devices, configure the one or more computing devices to perform operations comprising:
receiving a plurality of requests for audio transcription;
determining a compute graph for each request, wherein the compute graph comprises one or more artificial intelligence models;
batching the requests, based on the artificial intelligence models in the compute graph of each request;
loading one or more artificial intelligence models corresponding to a batch to a hardware module;
pushing processing of a request in the batch to the hardware module, loaded with the one or more artificial intelligence models, corresponding to the batch; and
offloading, from the hardware module, artificial intelligence models not needed for processing the requests in the batch.

9. The non-transitory computer storage of claim 8, wherein batching the requests is further based on priority data of the requests.

10. The non-transitory computer storage of claim 8, wherein the request comprises the request for automatic transcription of an audio file or an audio stream.

11. The non-transitory computer storage of claim 8, wherein the operations further comprise:
splitting the request into chunks;
indexing the chunks with index labels, indicating order of the chunks in the request from which the chunks split;
tagging the chunks with a request identifier, identifying the request from which a chunk was split;
tagging the chunks with a corresponding compute graph tag, wherein batching the requests comprises batching the chunks based on the compute graph tags and processing the request comprises processing the chunks in the hardware module, corresponding to the compute graph tag;
applying the index labels and the request identifier tags of the chunks to outputs of the processing of the chunks; and
assembling the outputs of the processing of the chunks, tagged with the request identifier of the request, at least in part based on the order indicated by the index labels.

12. The non-transitory computer storage of claim 8, wherein the hardware module comprises a graphics processing unit (GPU) or a tensor processing unit (TPU).

13. The non-transitory computer storage of claim 8, wherein the operations further comprise: recording metrics of the processing of the request by the hardware module; and modifying the batching based on the recorded metrics.

14. The non-transitory computer storage of claim 8,
wherein batching further comprises batching based on priority data of the requests,
wherein loading the one or more artificial intelligence models corresponding to a batch comprises:
determining batches sharing artificial intelligence models;
loading the shared artificial intelligence models into a shared hardware module; and
processing the requests in batches, sharing artificial intelligence models, in the shared hardware module, based on the priority data of each batch.

15. A system comprising a processor, the processor configured to perform operations comprising:
receiving a plurality of requests for audio transcription;
determining a compute graph for each request, wherein the compute graph comprises one or more artificial intelligence models;
batching the requests, based on the artificial intelligence models in the compute graph of each request;
loading one or more artificial intelligence models corresponding to a batch to a hardware module;
pushing processing of a request in the batch to the hardware module, loaded with the one or more artificial intelligence models, corresponding to the batch; and
offloading, from the hardware module, artificial intelligence models not needed for processing the requests in the batch.

16. The system of claim 15, wherein the operations further comprise:
splitting the request into chunks;
indexing the chunks with index labels, indicating order of the chunks in the request from which the chunks split;
tagging the chunks with a request identifier, identifying the request from which a chunk was split;
tagging the chunks with a corresponding compute graph tag, wherein batching the requests comprises batching the chunks based on the compute graph tags and processing the request comprises processing the chunks in the hardware module, corresponding to the compute graph tag;
applying the index labels and the request identifier tags of the chunks to outputs of the processing of the chunks; and
assembling the outputs of the processing of the chunks, tagged with the request identifier of the request, at least in part based on the order indicated by the index labels.

17. The system of claim 15,
wherein batching further comprises batching based on priority data of the requests,
wherein loading the one or more artificial intelligence models corresponding to a batch comprises:
determining batches sharing artificial intelligence models;
loading the shared artificial intelligence models into a shared hardware module; and
processing the requests in batches, sharing artificial intelligence models, in the shared hardware module, based on the priority data of each batch.

18. The method of claim 1, wherein the request comprises the request for automatic transcription of an audio file or an audio stream, and the method further comprises:
transcoding the audio file or the audio stream, based on requirements of the artificial intelligence models in the compute graphs; or extracting features from the audio file or the audio stream, based on the requirements of the artificial intelligence models in the compute graphs.

19. The non-transitory computer storage of claim 8, wherein the request comprises the request for automatic transcription of an audio file or an audio stream, and the operations further comprise:
- transcoding the audio file or the audio stream, based on requirements of the artificial intelligence models in the compute graphs; or
- extracting features from the audio file or the audio stream, based on the requirements of the artificial intelligence models in the compute graphs.

20. The system of claim 15, wherein the request comprises the request for automatic transcription of an audio file or an audio stream, and the operations further comprise:
- transcoding the audio file or the audio stream, based on requirements of the artificial intelligence models in the compute graphs; or
- extracting features from the audio file or the audio stream, based on the requirements of the artificial intelligence models in the compute graphs.

\* \* \* \* \*